(12) United States Patent
Cole Atkinson

(10) Patent No.: US 6,477,273 B1
(45) Date of Patent: Nov. 5, 2002

(54) CENTROID INTEGRATION

(75) Inventor: Matthew Robert Cole Atkinson, Cottage Grove, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

(21) Appl. No.: 09/422,584

(22) Filed: Oct. 21, 1999

(51) Int. Cl.$^7$ ................................................ G06K 9/46
(52) U.S. Cl. ...................... 382/174; 382/201; 382/288
(58) Field of Search .................... 382/174, 288, 382/201, 203, 289, 133, 225; 348/171, 172

(56) References Cited

U.S. PATENT DOCUMENTS

| | | | | |
|---|---|---|---|---|
| 4,513,438 A | * | 4/1985 | Graham et al. | 382/201 |
| 5,621,811 A | * | 4/1997 | Roder et al. | 382/147 |
| 5,872,870 A | * | 2/1999 | Michael | 382/174 |
| 6,100,901 A | * | 8/2000 | Mohda et al. | 345/440 |
| 6,199,986 B1 | | 3/2001 | Williams et al. | |

FOREIGN PATENT DOCUMENTS

| | | |
|---|---|---|
| EP | 0 176 910 A | 4/1986 |
| EP | 0 617 380 A | 9/1994 |
| GB | 2 294 319 A | 4/1996 |
| GB | 2318637 A | 4/1998 |
| WO | WO 99/08233 | 2/1999 |

OTHER PUBLICATIONS

Jarreau et al. "2–Dimensional Object Recognition for the ISAC System." Proc. IEEE, Southeastcon '92, vol. 1, Apr. 1992, pp. 27 30.*

Farrow, G. S. D. et al., "Detecting The Skew Angle In Document Images", *Signal Processing, Image Communication*, NL, Elsevier Science Publishers, Amsterdam, vol. 6, No. 2, May 1, 1994, pp. 101–114.

Yu, B. et al., "A Robust And Fast Skew Detection Algorithm For Generic Documents", *Pattern Recognition, US, Pergamon Press Inc., Elmsford, NY*, vol. 29, No. 10, Oct. 1, 1996, pp. 1599–1629.

Srihari, et al., "Analysis Of Textual Images Using The Hough Transform", *Machine Vision and Application, DE Springer Verlag*, vol. 2, No. 2, 1989, pp. 141–153.

Baird, Henry S., "The Skew Angle of Printed Documents", Symposium On Hybrid Imaging, 1987, pp. 21–24.

*The Image Processing Handbook*, second edition by John C. Russ (CRC Press 1995) pp. 394–396, 416–418.

* cited by examiner

*Primary Examiner*—Jon Chang
(74) *Attorney, Agent, or Firm*—Charles L. Dennis, II; Philip Y. Dahl

(57) ABSTRACT

Patterns in an image or graphical representation of a dataset are identified through centroid integration. The image or graphical representation is digitized. A collapsed image is created by identifying the centroid and at least one characteristic value for each feature in the digitized image. A shape, such as a line, curve, plane or hypersurface, is stepped across the image. At each step, the characteristic values are summed for all centroids within a predetermined distance of the shape. Peaks in the resulting summation represent matches between the shape and a pattern in the data, with steeper peaks representing a better match. Different shapes, or the same shape at different angles, can be applied to the data to find better fits with the patterns in the image. The image can be multidimensional, with the shape being one dimension less than the image.

30 Claims, 2 Drawing Sheets

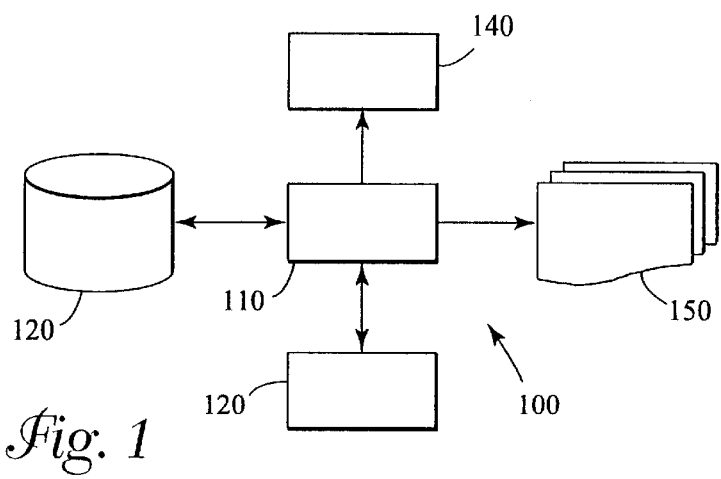
Fig. 1
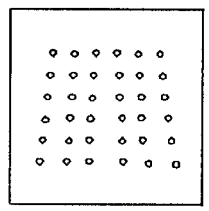
Fig. 2
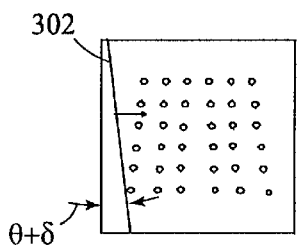 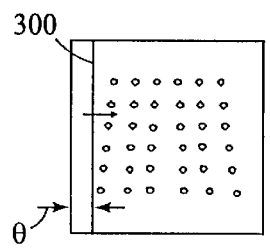 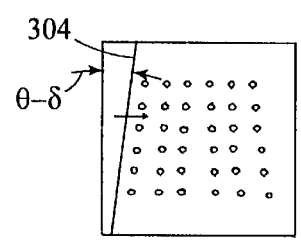
Fig. 3a     Fig. 3b     Fig. 3c
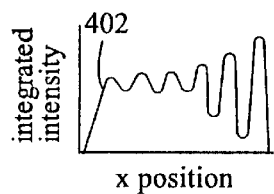 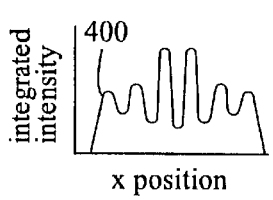 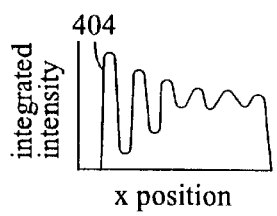
Fig. 4a     Fig. 4b     Fig. 4c

CENTROID INTEGRATION

BACKGROUND OF THE INVENTION

1. Technical Field

The present invention relates to methods and systems for identifying objects in an image, and in particular, to methods and systems for identifying lines, curves or similar shapes in an image or graphical representation of a dataset.

2. Description of the Related Art

There are many applications for machine vision and analysis in which it is useful to find the location of lines, curves or similar shapes in an image. For example, WO 99/08233 describes a large number of different types of analyses which can be conducted on assay well plates, gels and blots used in chemical, biochemical and physiological analyses. In such a use, it is helpful to be able to identify the position of the rows and columns of the sample grids on the plates, gels and blots.

Similarly, there are many manufactured products which include arrays, cross hatching or other regular patterns, such as printed or micro-replicated materials, and chip sockets. Machine vision is a useful way of inspecting such products, but, again, there often must be some ability to determine the orientation and position of the shapes in the image for this to be useful.

Many tests also vary with time, and it is important to be able to track the location of specific peaks or bands in the data as they move over time. For example, a graph showing the time variability in the strength of signal at particular wavelengths for nuclear magnetic resonance (NR) or infrared (IR) peak data sometimes will drift, and it is desirable to accurately identify the different peaks even as they shift around.

Still further, recent approaches to data mining and knowledge engineering seek out unrecognized patterns in data. For any data which can be represented graphically, finding lines, curves or other shapes in the resulting image can be a way to identify hidden patterns.

SUMMARY OF THE INVENTION

The present invention addresses these problems through a new technique called "centroid integration".

Centroid integration starts by obtaining an image or other graphical representation of the data to be analyzed, and digitizing the image into pixels. Using any suitable algorithm, individual features in the image are identified. The centroid position of each feature, and characteristic values of each feature all are determined. These are used to produce a "collapsed image," where each feature is represented by a point object at the centroid location, with the point object having values corresponding to the characteristic values. Any value appropriate to the application may be used as a characteristic value. For example, the area of the feature and the integrated intensity of the feature over its entire area would be typical characteristic values.

The detail level of the collapsed image can be controlled by using appropriate algorithms to distinguish between different features. Alternatively, the manner in which a particular algorithm distinguishes between different features can be adjusted, e.g., by requiring more or less discrimination in a chosen value in adjacent pixels to qualify as the boundary of a particular feature.

Once the collapsed image is produced, an integration line is established at an appropriate location in the collapsed image, such as at one edge. This integration line is swept across at least the relevant portion of the collapsed image in steps. At each step, the sum of a characteristic value, e.g., the integrated intensity, of each centroid within a predetermined region on either side of the line is determined and recorded. The result is a two dimensional plot with a series of peaks, each peak corresponding to a feature (or a band of features, if the features happen to lie on the same integration line).

Note that this process is different from simply integrating the image intensity along the search line. Due to the use of a collapsed image, each feature effectively has its characteristic values concentrated at its centroid.

Centroid integration results in a set of very well defined peaks in the resulting line profile. Regular integration would result in a set of smeared out peaks and, in the case of an image with significant variation in the positions of the individual features, the result would often be unusable. As a result, centroid integration is much more tolerant of local variation in feature positions than conventional integration.

The size of the steps (or "smoothing window") by which the integration line is moved can be important in some settings. For example, if the image is expected to include regularly spaced lines, optimum results often can be obtained by setting a smoothing window that is proportional to the spacing of the lines. The use application of centroid integration to images containing lines or grids of features is discussed in more detail in a co-assigned U.S. patent application Ser. No. 09/422,535, filed Oct. 21, 1999, entitled, "Autogrid Analisis", which is incorporated herein by reference.

If the characteristics of the data in the image are not known, and particularly if the objective is-to find hidden patterns in the data, it may be desirable to test a variety of smoothing window sizes to find one that maximizes the peak differentiation resulting from the centroid integration.

Similarly, the size of the predetermined region on either side of the integration line in which the characteristic values are summed may be varied. Typically, it will match the size of the smoothing window, but in some situations different sizes may be desirable. For example, it may be useful always to move the line in one pixel steps, but analyze the resulting data for different sized regions on either side of the integration line.

Centroid integration is not limited to integrating using straight lines or lines parallel to the sides of the image. Curves or other shapes can be used instead of a straight line to perform the integration, especially if the data is expected to be curved or if one is attempting to identify patterns in the image or data set matching the curve or other shape. It also often will be desirable to test the lines, curves or other shapes at a variety of orientations.

The image being analyzed can be virtually anything, ranging from a photograph of an object to a mathematical representation of a large dataset. In a photograph, the shape found by centroid integration will often be the actual shape of the object, but in a mathematical representation of a dataset, the shape may actually represent a pattern in the data.

Centroid integration also can be applied to higher dimensional analysis. In this situation, instead of moving a line or other one dimensional shape across a two-dimensional graph or image of data, a plane, hyperplane or other multi-dimensional shape is moved through a graph or other representation of data having one more dimension than the plane, hyperplane or other multi-dimensional shape. The characteristic values are summed to a particular point on the plane, hyperplane or other shape.

As will be apparent, centroid integration has a very wide range of potential applications to identify patterns and shapes.

BRIEF DESCRIPTION OF THE DRAWINGS

FIG. 1 is a schematic illustration of a prototypical computer system which the present invention might be used.

FIG. 2 is an illustration of a first image to be analyzed.

FIGS. 3a, 3b, 3c are illustrations of a scanning process applied to the image of FIG. 2 according to the present invention.

FIGS. 4a, 4b, 4c are graphs illustrating the initial results of the scanning process illustrated in FIGS. 3a, 3b, 3c, respectively.

DETAILED DESCRIPTION OF THE PREFERRED EMBODIMENTS

Figure 5:
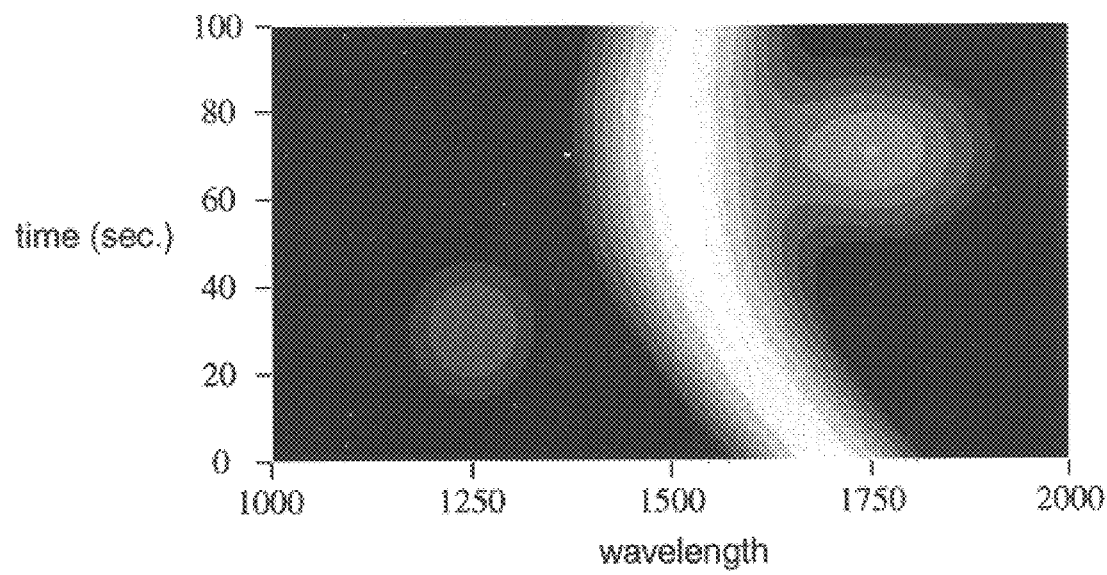
FIG. 5 illustrates an image of signal intensity of over time v. wavelength.

FIG. 1 illustrates a computer system 100 with which the present invention might be used. Computer system 100 includes central processing unit (CPU) 110, data storage devices 120 (such as random access memory (RAM), a hard drive, CD-ROM drive, diskette drive or the like), display 140 (such as a cathode ray tube, LED, LCD or plasma display) and printer 150 (such as a dot matrix printer, a laser printer, or an ink jet printer), associated such that CPU 110 can read and write to data storage devices 120, can control the images on display 140 and the output of printer 150. The present invention typically will be implemented on the computer system by software, which may be distributed in any suitable manner, such as on removable data storage media or by downloading to the computer system 100.

FIG. 2 illustrates an image provided by any suitable system. In the figure, the image is a picture of a slightly trapezoidal grid of dots, such as might result from a DNA assay test. If not initially created in digital form by the image capturing or creating equipment, the image is digitized into pixels. Features of interest in the image are identified by any suitable means. For example, features that are brighter or darker than a certain threshold intensity or features that are between two limiting threshold intensities might be identified as features of interest. Individual features are composed of touching pixels that satisfy the image intensity threshold requirements. This feature detection ability is available in most commercial image capture software packages. A detailed description of one method for achieving this can be found at *The Image Processing Handbook*, second edition by John C. Russ (CRC Press 1995) pages 394–96, 416–18.

Once the features are identified, a "collapsed image" is created. To do this, the centroid of each feature is determined, that is, the point that represents the center of the object based on a predetermined weighting scheme. A given feature may or may not be circular, so any suitable algorithm for identifying the centroid may be used, such as integrating intensity or position. The position of the centroid may be recorded in any suitable coordinate system, but typically will be in an X-Y coordinate system. In addition to the centroid, characteristic values of the feature are determined, e.g., the feature area in pixels, the integrated intensity or the temperature, and stored in data storage device 120 of computer system 100.

The resulting collapsed image can condense the enormous amount of data in the complete image to a much smaller set of data. For example, a 512×512 pixel image of a 3×4 element grid can be reduced from 262,144 pixels of data to 12 data structures, which nevertheless still contains the information needed for present purposes, resulting in dramatically improved processing times.

Note that while the invention is described herein in terms of lines and curves being moved across an image, with centroids being within predetermined distances of lines or points, this is for ease of description. It will be understood by one of skill in the art that it is not necessary to actually make such steps visible on a screen or other display device. CPU 110 can make the relevant calculations, or any mathematically equivalent calculations, without providing a display in the process. For example, CPU 110 usually can process the data most expeditiously by comparing the locations and values in the condensed image array to the calculated locations of the relevant lines and points to which the centroids are being compared.

Referring to FIG. 3b, integration line 300 is created at one side of the collapsed image at a base angle $\theta$ to the side of the image ($\theta$ can be 0, as shown in the drawing), and swept across the collapsed image in steps. At each step, the characteristic value of each centroid within a predetermined region on either side of the line is determined and recorded. The result is a two dimensional plot with a series of peaks, each peak corresponding to a column of the grid, as shown in FIG. 4b.

The size of the steps by which the integration line is moved is the "smoothing window". With proper selection of the size of the smoothing window, centroid integration results in a set of very well defined peaks in the resulting line profile. Regular integration would result in a set of smeared out peaks and, in the case of a grid with some variation in the positions of the individual features, the result would often be unusable. As a result, centroid integration is much more tolerant of local variation in feature positions than conventional integration.

A smoothing window W is used to take into account the local variability of the centroids from their nominal positions. Ideally, the window size is based on the expected pitch of the data, e.g., the spacing of the rows and columns in the grid being analyzed in FIG. 2. The desired size of the smoothing window W is that size which will most clearly generate distinct peaks in the integrated intensity during centroid integration. The smoothing window can be adjusted manually or by any technique which can establish distinct peaks. If the pitch spacing P in pixels is known and is greater than 4, the optimum smoothing window W in pixels will be about:

$$W=0.35*P-1.53$$

This equation has been determined empirically by evaluating a wide range of samples with local feature variations ranging from 0 (no deviation from a regular grid) to 50% (the variation in feature position is so large that the rows or columns overlap).

If the pitch spacing P is not known, but the elements are known to be in a regular pattern, one technique for automating the initial selection is to divide the size of the image by the known number of elements in the pattern. For example, for the grid, this would mean assuming that the number of features in each row and column is the square root of the number of features identified in creating the collapsed image, then approximating the pitch P of the rows and columns by dividing the size of the image by the square root of the number of features.

If no initial information is available about the possible patterns, then a variety of smoothing window sizes can be attempted, and the size can be optimized by selecting the size that provides the clearest peaks.

FIGS. 3a and 3c illustrate the effects of conducting the centroid integration using a line 302 at a slight variance angle +δ to the original search angle θ, and a line 304 at a slight variance angle −δ to the original search angle θ.

As can be seen in FIGS. 4b, 4a, 4c, the slopes of the first peak 400, 402, 404 in the resulting centroid integration vary based on how closely the angle of the integration line matched the angle of the actual column in the grid. The steeper the slope on the first peak, the closer that corresponding integration line was to being parallel to the column of the grid.

Checking the results at multiple angles in this fashion can be a way to quickly find the optimum angle for the data. To do this, the slopes of the peaks in summed characteristic values for the lines 404, 400, 402 at θ−δ, θ and θ+δ are compared. The line with the steepest slope is the closest match to the data. If the difference between the slopes is within a tolerance limit, then it can be assumed that a match has been found.

If the difference between the slopes is not within the tolerance limit, the process is iterated using varying values of θ and δ, until the differences are within the tolerance limit. In doing this, if the peak 400 has the highest slope, the next iteration preferably uses the same value for θ as the prior iteration, but a smaller value for δ, while if the peak 400 does not have the highest slope, the next iteration preferably uses the same value for δ as the prior iteration, but resets θ to match the angle of whichever of lines 302, 304 corresponds to the peak 402, 404 with the highest slope.

If multiple features are aligned, as with a grid, it may be desirable to identify the line on which they are aligned. This can be done either by first finding all centroids within a predetermined distance of the crest of the peak in the centroid integration plot, or by finding all centroids between the blank regions adjacent to the peaks in the centroid integration plot (blank regions may be easier to identify than the exact peak, and do not require pre-defining the spacing of the centroids around the crest). The positions of these centroids are used to define a best fit line, with each centroid being weighed by some combination of its characteristic values, e.g., its area and its integrated intensity.

The process can be iterated to find further lines or other curves at other locations across the image, or started from another side if the image to find patterns in the image at other orientations, e.g., rows in a grid. When the process is iterated, it often will be advantageous to start each iteration using an integration shape, angle and position matching the best fit found in the prior iteration.

Figure 6:
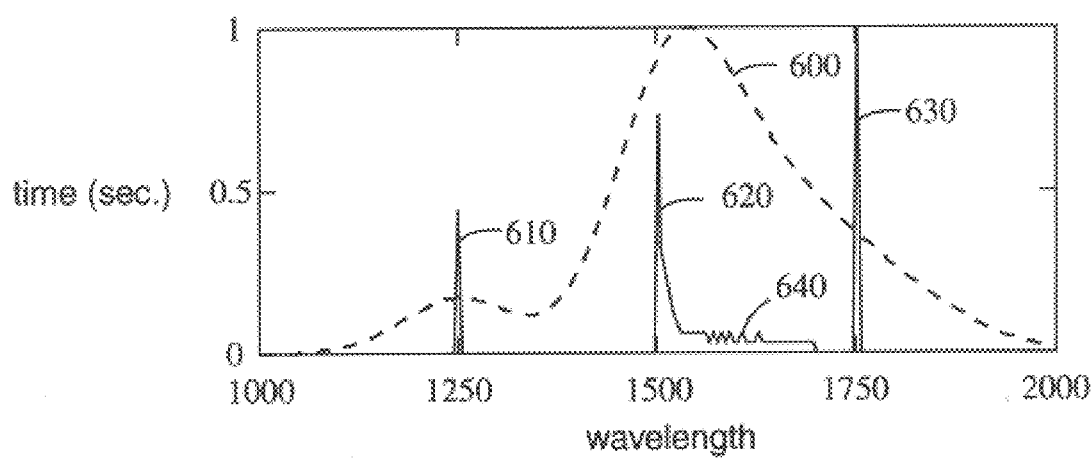
FIG. 6 illustrates both conventional integration and centroid integration of the image of FIG. 5.

FIGS. 5 and 6 illustrate an application of centroid integration to an "image" which is a graphical representation of data, and compares it to conventional integration.

FIG. 5 illustrates one variable (e.g., time, on the y axis) v. another variable (e.g., signal intensity at particular wavelengths, with the lighter colors indicating stronger intensity at a particular point on the graph).

Dashed line 600 in FIG. 6 illustrates the results of conventional integration of the data of FIG. 5. Solid lines 610, 620, 630, 640 illustrate the result of centroid integration. As will be apparent, conventional integration blurs the location of the peaks at 1250 and 1500 units on the x axis, and altogether misses the peak at 1750 units on the x axis. In contrast, centroid integration shows all three peaks 610, 620, 630, as well as additional details 640 above the 1500 unit line on the graph.

The detail level of the collapsed image can be controlled by using appropriate algorithms to distinguish between different features. Alternatively, the parameters used by a particular algorithm to distinguish between different features can be adjusted. For example, the threshold settings used to determine that adjacent pixels are or are not on the same side of the boundary of a particular feature can be adjusted.

The size of the predetermined region on either side of the integration line in which the characteristic values are summed during centroid integration also may be varied to adjust the response. Typically, it will match the size of the smoothing window, but in some situations different sizes may be desirable, e.g., if there is great deal of noise in the image.

Centroid integration is not limited to integrating using straight lines or lines parallel to the sides of the image. Curves or other shapes can be used instead of a straight line to perform the integration, especially if the data is expected to be curved or if one is attempting to identify unknown patterns in the image or data set matching the curve or other shape. It also may be desirable to test the lines, curves or other shapes at a variety of orientations, as shown above with FIGS. 3 and 4.

While the description above has used two dimensional graphs and one dimensional lines and curves for ease of description, higher dimensional images and shapes can also be used. In each case, the integration shape will be one dimension less than the image being analyzed, so that the characteristic values of the features in the image can be collapsed down one dimension during centroid integration. As will be apparent, centroid integration could be conducted against the results of the prior centroid integration to identify patterns in data in a fashion similar to the way in which repeated conventional differentiation can define distance, velocity, acceleration, change in acceleration, etc.

It will be understood that these exemplary embodiments in no way limit the scope of the invention. Other modifications of the invention will be apparent to those skilled in the art in view of the foregoing description. For example, the order in which many of the steps of the method of the invention are executed may be varied from that described and claimed here, while still achieving the same result and without departing from the scope of the present invention. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and scope of the appended claims are covered.

I claim:

1. A method of identifying a shape among a plurality of features in an image, comprising:
   a) obtaining a digitized image;
   b) identifying the features in the image;
   c) creating a collapsed image by determining a centroid and at least one characteristic value for each feature;
   d) placing a first integration shape in the collapsed image;
   e) summing the characteristic values of all features which have their centroid within a predetermined region on either side of the first integration shape;
   f) stepping the integration shape across the collapsed image by a predetermined distance;
   g) repeating steps (e) and (f) until the integration shape has crossed at least a portion of the image for which analysis is desired;

h) analyzing the summed characteristic values to find peaks therein, and identifying the locations of the integration shape corresponding to the peaks as indicating the presence of a pattern in the features in the image that matches the first integration shape.

2. The method of claim 1, further comprising iterating (d) through (h) in claim 1 for further integration shapes in other portions of the image.

3. The method of claim 2, wherein the initial angle and position used for the integration shape in each iteration matches the best fit values found in the previous iteration.

4. The method of claim 1, wherein the collapsed image is a multidimensional image, and the integration shape has one less dimension than the collapsed image.

5. The method of claim 4, wherein the collapsed image is a two dimensional image and the integration shape is a line or curve.

6. The method of claim 1, further comprising:
   a) repeating steps (d) through (h) in claim 1 for a second integration shape at an angle $\delta$ to the first integration shape;
   b) comparing the slope of the peak in the summed characteristic values for the second integration shape to the slope obtained for the first integration shape and identifying the integration shape having the peak with a higher slope as the better fit to the data.

7. The method of claim 1, wherein the first integration shape is at a base angle $\theta$ to the collapsed image, the method further comprising:
   a) repeating steps (d) through (h) in claim 1 for a second integration shape at an angle $+\delta$ to the first integration shape and for a third integration shape at an angle $-\delta$ to the first integration shape;
   b) determining the difference in the slopes of the peaks in the summed characteristic values for the first, second and third integration shapes;
   c) if the difference is within a predetermined tolerance limit, defining the one of the first, second or third integration shapes having the peak with the highest slope among the three shapes as the closest match, and identifying the angle and position of that shape as the angle and position of a pattern in the image;
   d) if the difference is not within the predetermined tolerance limit, iterating steps (a) through (d) with varying values of $\theta$ and $\delta$ until the difference in the slopes is within the predetermined tolerance limit.

8. The method of claim 7, wherein the values of $\theta$ and $\delta$ are varied during each iteration by the method comprising:
   a) determining if the first integration shape has the peak with the highest slope;
   b) if it does, using the same base angle $\theta$ as in the prior iteration and a smaller value for $\delta$ than in the prior iteration; and
   c) if it does not, resetting the base angle $\theta$ to match the angle of the integration shape having the peak with the highest slope in the prior iteration and using the same value for $\delta$ as in the prior iteration.

9. The method of claim 1, further comprising:
   a) repeating steps (d) through (h) in claim 1 for a second integration shape which is a different shape from the first integration shape;
   b) comparing the slope of the peak in the summed characteristic values for the second integration shape to the slope obtained for the first integration shape and identifying the integration shape having the peak with a higher slope as the better fit to the data.

10. The method of claim 1, wherein the predetermined distance by which the integration shape is stepped is equal to a smoothing window W, wherein the smoothing window W is established such that it most clearly generates distinct peaks in integrated intensity during centroid integration.

11. A system for identifying the position in an image of a plurality of features in a substantially four-side, four-cornered grid of features, each feature having a centroid, the system comprising:
   a) an image device for providing a digitized image;
   b) a data storage device; and
   c) a central processing unit for receiving the digitized image from the image device and which can write to and read from the data storage device, the central processing unit being programmed to:
      i) receive a digitized image from the image device;
      ii) identify the features in the image;
      iii) determine a centroid location and at least one characteristic value for each feature;
      iv) create and record in the data storage device a collapsed image comprising the centroid location and characteristic value for each feature;
      v) place a first integration shape in the collapsed image;
      vi) sum the characteristic values of all features which have their centroid within a predetermined region on either side of the first integration shape;
      vii) step the first integration shape across the collapsed image by a predetermined distance;
      viii) repeat steps (vi) and (vii) until the integration shape has crossed at least a portion of the image for which analysis is desired;
      ix) analyze the summed characteristic values to find peaks therein; and
      x) identify and record in the data storage device the locations of the first integration shape corresponding to the peaks as indicating the presence of a pattern in the features in the image that matches the first integration shape.

12. The system of claim 11, wherein the central processing unit is further programmed to iterate (c)(v) through (c)(x) in claim 11 for further integration shapes in other portions of the image.

13. The system of claim 12, wherein the initial angle and position used by the central processing unit for the integration shape in each iteration matches the best fit values found in the previous iteration.

14. The system of claim 11, wherein the collapsed image is a multidimensional image, and the integration shape has one less dimension than the collapsed image.

15. The system of claim 14, wherein the collapsed image is a two dimensional image and the integration shape is a line or curve.

16. The system of claim 11, wherein the central processing unit further is programmed to:
   a) repeat steps (c)(v) through (c)(x) in claim 11 for a second integration shape at an angle $\delta$ to the first integration shape;
   b) compare the slope of the peak in the summed characteristic values for the second integration shape to the slope obtained for the first integration shape; and
   c) identify and record in the data storage device the integration shape having the peak with a higher slope as the better fit to the data.

17. The system of claim 11, wherein the first integration shape is at a base angle $\theta$ to the collapsed image and the central processing unit further is programmed to:

a) repeat steps (c)(v) through (c)(x) in claim 11 for a second integration shape at an angle +δ to the first integration shape and for a third integration shape at an angle −δ to the first integration shape;
b) determine the difference in the slopes of the peaks in the summed characteristic values for the first, second and third integration shapes;
c) if the difference is within a predetermined tolerance limit,
   i) define the one of the first, second or third integration shapes having the peak with the highest slope among the three shapes as the closest match; and
   ii) identify and record in the data storage device the angle and position of that shape as the angle and position of a pattern in the image;
d) if the difference is not within the predetermined tolerance limit, iterate steps (a) through (d) with varying values of θ and δ until the difference in the slopes is within the predetermined tolerance limit.

18. The system of claim 17, wherein the central processing unit further is programmed to vary the values of θ and δ during each iteration by:
   a) determining if the first integration shape has the peak with the highest slope;
   b) if it does, using the same base angle θ as in the prior iteration and a smaller value for δ than in the prior iteration; and
   c) if it does not, resetting the base angle θ to match the angle of the integration shape having the peak with the highest slope in the prior iteration and using the same value for δ as in the prior iteration.

19. The system of claim 11, wherein the central processing unit further is programmed to:
   a) repeat steps (c)(v) through (c)(x) in claim 11 for a second integration shape which is a different shape from the first integration shape;
   b) compare the slope of the peak in the summed characteristic values for the second integration shape to the slope obtained for the first integration shape; and
   c) identify and record in the data storage device the integration shape having the peak with a higher slope as the better fit to the data.

20. The system of claim 11, wherein the predetermined distance by which the central processing unit steps the integration shape is equal to a smoothing window W, wherein the smoothing window W is established such that it most clearly generates distinct peaks in integrated intensity during centroid integration.

21. Data storage media having recorded thereon software that upon installation in a computer and execution of the software will cause the computer to carry out a method of identifying a shape among a plurality of features in an image, the method comprising:
   a) obtaining a digitized image;
   b) identifying the features in the image;
   c) creating a collapsed image by determining a centroid and at least one characteristic value for each feature;
   d) placing a first integration shape in the collapsed image;
   e) summing the characteristic values of all features which have their centroid within a predetermined region on either side of the first integration shape;
   f) stepping the integration shape across the collapsed image by a predetermined distance;
   g) repeating steps (e) and (f) until the integration shape has crossed at least a portion of the image for which analysis is desired;
   h) analyzing the summed characteristic values to find peaks therein, and identifying the locations of the integration shape corresponding to the peaks as indicating the presence of a pattern in the features in the image that matches the first integration shape.

22. The data storage media of claim 21, wherein the method to be executed further comprises iterating (d) through (h) in claim 21 for further integration shapes in other portions of the image.

23. The data storage media of claim 22, wherein the initial angle and position used for the integration shape in each iteration matches the best fit values found in the previous iteration.

24. The data storage media of claim 21, wherein the collapsed image is a multidimensional image, and the shape has one less dimension than the collapsed image.

25. The data storage media of claim 22, wherein the collapsed image is a two dimensional image and the shape is a line or curve.

26. The data storage media of claim 21, wherein the method to be executed further comprises repeating steps (d) through (h) in claim 21 for a second integration shape at an angle δ to the first integration shape;
   a) comparing the slope of the peak in the summed characteristic values for the second integration shape to the slope obtained for the first integration shape and identifying the integration shape having the peak with a higher slope as the better fit to the data.

27. The data storage media of claim 21, wherein the first integration shape is at a base angle θ to the collapsed image, and the method to be executed further comprises:
   a) repeating steps (d) through (h) in claim 21 for a second integration shape at an angle +δ to the first integration shape and for a third integration shape at an angle −δ to the first integration shape;
   b) determining the difference in the slopes of the peaks in the summed characteristic values for the first, second and third integration shapes;
   c) if the difference is within a predetermined tolerance limit, defining the one of the first, second or third integration shapes having the peak with the highest slope among the three shapes as the closest match, and identifying the angle and position of that shape as the angle and position of a pattern in the image;
   d) if the difference is not within the predetermined tolerance limit, iterating steps (a) through (d) with varying values of θ and δ until the difference in the slopes is within the predetermined tolerance limit.

28. The data storage media of claim 27, wherein the values of θ and δ are varied during each iteration by the method comprising:
   a) determining if the first integration shape has the peak with the highest slope;
   b) if it does, using the same base angle θ as in the prior iteration and a smaller value for δ than in the prior iteration; and
   c) if it does not, resetting the base angle θ to match the angle of the integration shape having the peak with the highest slope in the prior iteration and using the same value for δ as in the prior iteration.

29. The data storage media of claim 21, wherein the method to be executed further comprises:

a) repeating steps (d) through (h) in claim 21 for a second integration shape which is a different shape from the first integration shape;
b) comparing the slope of the peak in the summed characteristic values for the second integration shape to the slope obtained for the first integration shape and identifying the integration shape having the peak with a higher slope as the better fit to the data.

30. The data storage media of claim 21, wherein the predetermined distance by which the integration shape is stepped is equal to a smoothing window W, wherein the smoothing window W is established such that it most clearly generates distinct peaks in integrated intensity during centroid integration.

* * * * *

UNITED STATES PATENT AND TRADEMARK OFFICE
CERTIFICATE OF CORRECTION

PATENT NO.    : 6,477,273 B1
DATED         : November 5, 2002
INVENTOR(S)   : Atkinson, Matthew R. C.

It is certified that error appears in the above-identified patent and that said Letters Patent is hereby corrected as shown below:

Column 1,
Line 33, "(NR)" should read -- (NMR) --

Column 9,
Lines 21 and 22, "values of 0 and 6" should read -- values of $\theta$ and $\delta$ --

Signed and Sealed this

Fourth Day of May, 2004

JON W. DUDAS
*Acting Director of the United States Patent and Trademark Office*